United States Patent [19]
Pande-Rolfsen

[11] 3,815,329
[45] June 11, 1974

[54] SYSTEM FOR UNLOADING OIL

[75] Inventor: Henrik Pande-Rolfsen, Snaroya, Norway

[73] Assignee: Thune-Eureka A/S, Oslo, Norway

[22] Filed: May 14, 1973

[21] Appl. No.: 359,895

[52] U.S. Cl. .................. 55/163, 55/189, 417/279
[51] Int. Cl. ............................................. B01d 19/00
[58] Field of Search ............... 55/21, 55, 163, 189; 137/209; 417/279

[56] References Cited
UNITED STATES PATENTS

| | | | |
|---|---|---|---|
| 1,671,601 | 5/1928 | Mills | 55/189 |
| 2,571,219 | 10/1951 | De Cew | 55/55 X |
| 3,362,132 | 1/1968 | Schellenberg | 55/55 X |
| 3,460,319 | 8/1969 | Tkach | 55/55 X |

*Primary Examiner*—Carlton R. Croyle
*Assistant Examiner*—Richard Sher
*Attorney, Agent, or Firm*—Young & Thompson

[57] ABSTRACT

A separator tank for separating air from oil in an oil unloading system is provided with a pressure sensitive device connected to means for maintaining a predetermined pressure in the tank by controlling an adjustable valve on the discharge side of a pump, the inlet side of which being connected to the separator tank.

2 Claims, 1 Drawing Figure

PATENTED JUN 11 1974 3,815,329
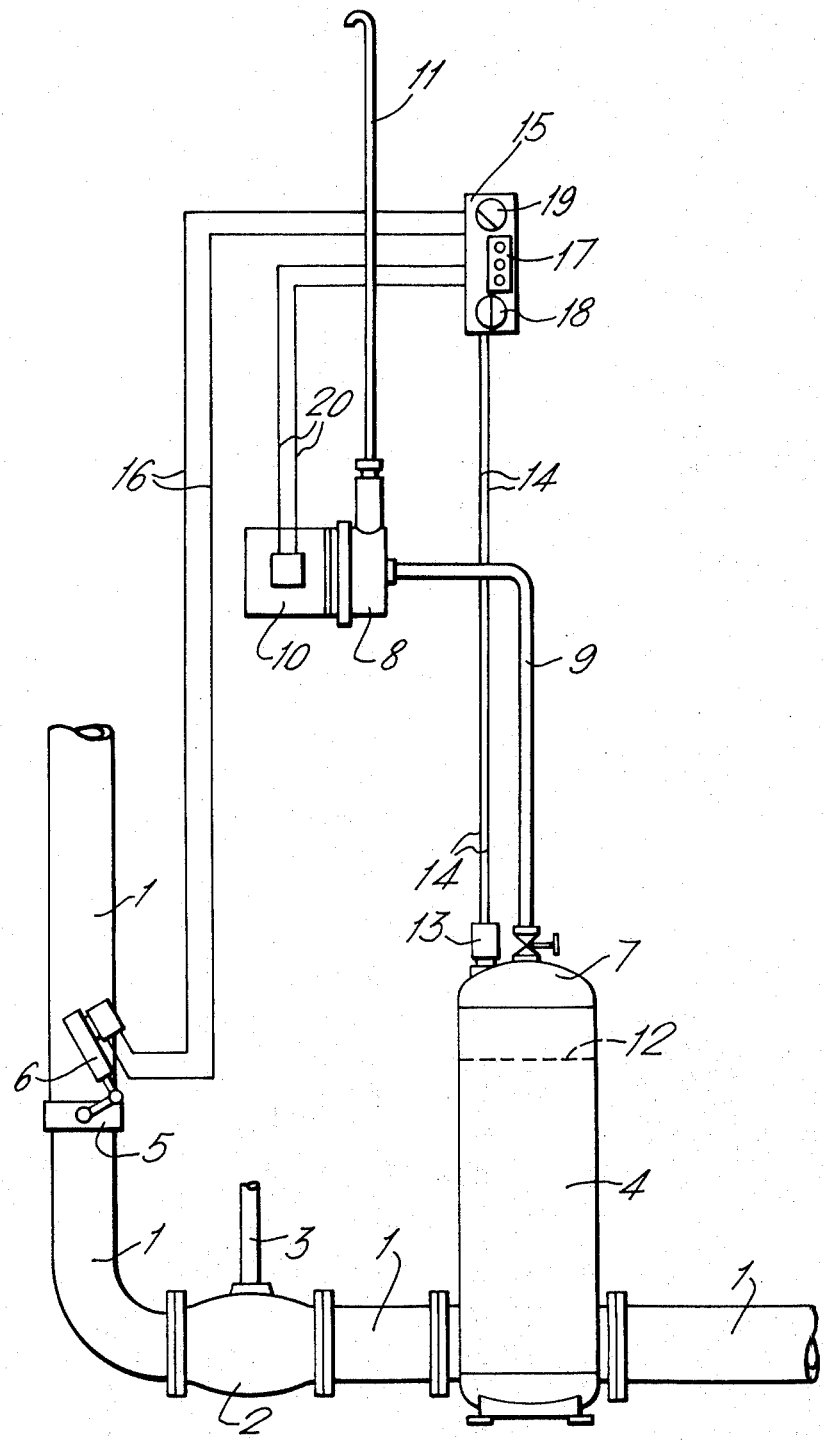

SYSTEM FOR UNLOADING OIL

The present invention relates to an improvement in a system for unloading oil, particularly from tankers which are to be emptied as much as possible at the location of unloading. Systems of the type in question include a high-capacity discharge pump and a separator tank in the main pipe line from the tank is connected into the suction side of the pump, an adjustable valve being provided on the pressure side of the pump, said valve being adjusted substantially directly from a sensor on the separator tank.

With such high capacity pumps the operation and life-time of the pump is adversely affected if air is pumped together with the liquid cargo, and the purpose of the separator tank is to separate as much as possible of air and gas included, and any air and gas carried along during the last part of the loading phase.

If it becomes necessary to reduce the amount of liquid conveyed by the pump, the valve on the pressure side of the pump is closed somewhat and it is previously known to provide the separator tank with a level-indicator which adjusts the valve in accordance with the level of the liquid surface in the separator tank. The level-indicator is fairly complex, however, and it is not, in fact, the level of the surface of the liquid which is of interest provided that this is higher than the inlet to the pump. However, a partial vacuum will always prevail above the surface of the liquid and it has proved to be much more advantageous to adjust the valve on the pressure side of the pump, with the partial vacuum in the separator tank as controlling parameter. The fact that the liquid surface falls when the pressure in the tank is higher, and rises when the pressure is lower, is of lesser significance here, since it is the amounts of gas separated which, in the present invention, ensure control of the valve on the pressure side of the discharge pump. On separation of large amounts of gas, therefore, the valve will close due to increasing pressure, while the valve on the pressure side of the pump will open for smaller amounts of separated gas.

The invention thus relates to an improvement in a system for unloading oil from tankers and the like, including a discharge pump, a separator tank connected to the suction side of the pump, an adjustable valve connected to the pressure side of the pump, a sensor for adjusting the controllable valve, and a vacuum source which provides a partial vacuum in the separator tank, and the invention is substantially characterized in that the separator tank is provided with a pressure sensor adapted to be affected by the partial vacuum in the separator tank, and connected to a control circuit for the controllable valve in order to adjust the said valve on varying partial vacuum in the tank.

In addition to controlling the valve, the pressure in the separator tank may also be used for adjusting the capacity of the vacuum pump so that the capacity increases on increasing pressure and the capacity decreases on decreasing pressure, and a further feature of the invention relates to this effect.

The invention is further explained in the following with reference to the drawing where, 1 is a discharge line with a pump 2 which, via a spindle 3, is operated by a turbine, for example, on deck. On the suction side of the pump 2, a separator tank 4 is inserted in the pipe line 1, separation of air and gas from the liquid cargo being carried out in the said separator tank. On the pressure side of the pump 2, a controllable valve 5 is inserted in the line 1, the said valve in the example shown here being adjusted by means of a compressed air cylinder 6.

Air and gas separated in the separator tank 4 collect in the upper portion 7 thereof and are conveyed away by means of a vacuum pump 8 to a line 9. The vacuum pump 8 is operated by an electromotor 10 and conveys the gases further out through a pipe 11.

In order that the system can operate satisfactorily, the liquid level indicated in broken lines at 12 in the tank 4 is higher than the inlet to the pump 2 so that air and gas are not carried along through the pump 2 and through the remaining part of the discharge line 1. In order to ensure this and in accordance with the invention, the separator tank 4 is provided with a pressure sensor 13 which controls the pneumatic control means 6 for the valve 5. When the air and gas separated from the oil being pumped is more than the vacuum pump 8 is capable of conveying away, the pressure in the upper portion 7 of the separator tank 4 increases, whereby the liquid level 12 falls. The pressure sensor 13 then transmits signals which substantially close the valve 5 so that the amount conveyed by the pump 2 is reduced in conformity with the pressure increase above the liquid surface in the separator tank 4. The pressure sensor 13 may, by means of expedient circuits 14, transmit signals to a control panel 15, for example, on deck and from there signals are transmitted via circuits 16 to control the control means 6. The control panel 15 may be provided with operating members 17 and instruments 18 and 19 which indicate, for example, the pressure in the upper part of the separator tank 4 and the position of the valve 5, other parameters being indicated as required.

The pressure sensor 13 may further control the electric motor 10 which operates the vacuum pump 8 via circuits 20, so that the pump either step-wise or continuously can regulate its capacity in accordance with the amounts of gas yielded by the oil in the separator tank 4. The amounts of air and gas may increase substantially toward the end of the discharge phase.

In the example described, pneumatically operated control systems are envisaged, however, other embodiment examples may well be utilized within the scope of the invention, for example, hydraulic or electric means if this is permissable. Nor is the utilization of the invention restricted to tankers but can also be used for emptying tanks on land.

Having described my invention, I claim:

1. Improvement in a system for unloading oil from tankers and the like including a discharge pump, a gas-liquid separator tank connected to the suction side of the pump, an adjustable valve connected to the pressure side of the pump, a sensor communicating with said tank for controlling the adjustable valve, a vacuum pump connected to said tank for providing a partial vacuum in the separator tank, said sensor sensing the degree of partial vacuum in the separator tank and connected to a control circuit for the adjustable valve so that said valve restricts liquid flow in response to a decrease in the degree of partial vacuum.

2. Improvement according to claim 1, characterized in that the sensor is adapted to control the capacity of the vacuum pump to maintain a desired degree of partial vacuum in the separator tank.

* * * * *